(12) United States Patent
Sawanami et al.

(10) Patent No.: US 12,321,885 B2
(45) Date of Patent: Jun. 3, 2025

(54) PHYSICAL DISTRIBUTION MANAGEMENT SYSTEM AND PHYSICAL DISTRIBUTION MANAGEMENT METHOD

(71) Applicant: FUJI CORPORATION, Chiryu (JP)

(72) Inventors: Hisato Sawanami, Kariya (JP); Koji Kawaguchi, Kasugai (JP); Takuya Oda, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/692,597

(22) PCT Filed: Sep. 28, 2021

(86) PCT No.: PCT/JP2021/035500
§ 371 (c)(1),
(2) Date: Mar. 15, 2024

(87) PCT Pub. No.: WO2023/053159
PCT Pub. Date: Apr. 6, 2023

(65) Prior Publication Data
US 2024/0386364 A1    Nov. 21, 2024

(51) Int. Cl.
*G06Q 10/083*      (2024.01)

(52) U.S. Cl.
CPC .................. *G06Q 10/083* (2013.01)

(58) Field of Classification Search
CPC .................................................... G06Q 10/083
USPC ........................................................ 705/337
See application file for complete search history.

(56) References Cited

U.S. PATENT DOCUMENTS

| 10,970,670 B2 * | 4/2021 | Baldwin | G06K 7/1413 |
| 11,124,401 B1 | 9/2021 | Jarvis et al. | |
| 2020/0273133 A1 | 8/2020 | Morris | |

FOREIGN PATENT DOCUMENTS

| JP | 2003-327331 A | 11/2003 |
| JP | 2006-62864 A | 3/2006 |
| JP | 2007-153489 A | 6/2007 |
| JP | 2013-20556 A | 1/2013 |
| JP | 2019-8678 A | 1/2019 |

(Continued)

OTHER PUBLICATIONS

"Development of a Robot-Based System for Automated Unloading of Variable Packages out of Transport Units and Containers" Published by IEEE (Year: 2008).*

(Continued)

*Primary Examiner* — Zeina Elchanti
(74) *Attorney, Agent, or Firm* — Oblon, McClelland, Maier & Neustadt, L.L.P.

(57) ABSTRACT

A physical distribution management system includes a storage device to store, for each of multiple delivery vehicles, an ID of a delivery vehicle, a package to be loaded onto the delivery vehicle, a shipping destination of the package, and an ID of the shipping gate where loading onto the delivery vehicle is performed, in association with each other, an ID acquisition device to acquire an ID of a delivery vehicle that has arrived at the physical distribution center, and a management device to determine the shipping gate where the loading onto the delivery vehicle is performed, based on the ID of the delivery vehicle acquired by the ID acquisition device and information stored in the storage device, and notify the delivery vehicle of the determined shipping gate.

8 Claims, 5 Drawing Sheets

(56) References Cited

FOREIGN PATENT DOCUMENTS

| JP | 2021-39644 A | 3/2021 |
| KR | 10-1807606 81 | 10/2018 |
| WO | WO 2021/019596 A1 | 2/2021 |
| WO | WO 2021/097340 A1 | 6/2021 |

OTHER PUBLICATIONS

International Search Report Issued Jan. 11, 2022, in PCT/JP2021/035500, filed on Sep. 28, 2021, 2 pages.

* cited by examiner

PHYSICAL DISTRIBUTION MANAGEMENT SYSTEM AND PHYSICAL DISTRIBUTION MANAGEMENT METHOD

TECHNICAL FIELD

The present disclosure relates to a physical distribution management system and a physical distribution management method applied to a physical distribution center including multiple shipping gates.

BACKGROUND ART

Conventionally, as a product receiving and shipping registration processing system for receiving multiple products (packages) from a supplier and separately shipping the products to each shop, it is known that the system includes delivery carriers (cargo carts) for loading and transferring products and a passage gate provided along the passage from receiving to shipping through which the delivery carriers pass (for example, refer to Patent Literature 1). In this receiving and shipping registration processing system, a non-contact wireless tag in which product information is recorded is attached to a product, and a non-contact wireless tag in which identification information or the like is recorded is attached to a delivery carrier. The passage gate includes a swing bar capable of selectively opening and closing the gate, an optical sensor for detecting entry and passing of delivery carriers, multiple antennas for communicating with the non-contact wireless tags of products and delivery carriers, an information terminal capable of reading and writing information recorded on the non-contact wireless tags of the products and the delivery carriers via the antennas, and a control device. Further, the control device of the passage gate controls the information terminal based on the signal from the optical sensor, and manages the information on the non-contact wireless tags read by the information terminal as a database. In addition, the control device performs compliance assessment relating to information on the non-contact wireless tags of the products and the delivery carriers, and controls opening and closing of the swing bar.

The delivery center where the receiving and shipping registration processing system is applied includes a receiving area for verifying products delivered from a supplier, a sorting area for distributing the products to each shop, and a shipping area for verifying products delivered to each shop. In the receiving area, products delivered from a supplier are loaded onto delivery carriers, and the delivery carriers are passed through the passage gate of the receiving registration processing device. Accordingly, the product information or the like read at the passage gate is distributed to the center device. Next, the delivery carriers are transferred to the sorting area by an operator. In the sorting area, while referring to the order information, the operator uses a mobile terminal (not illustrated) or the like to transfer the products loaded onto the delivery carriers from the receiving area to standby delivery carriers provided for shop units and product categories. At this time, the delivery carriers on standby, where the amount of transferred products reaches a certain amount in consideration of the truck loading efficiency, are treated as delivery carriers awaiting shipping inspection. In the shipping area, multiple shipping registration processing devices corresponding to the shipping inspection processing amounts are disposed, and the delivery carriers awaiting the shipping inspection in the sorting area are passed through the passage gate of the shipping registration processing device. Accordingly, the product information or the like are distributed to the center device, and only the delivery carriers awaiting the shipping inspection for which the registration processing is normally completed are handed over to the delivery company.

PATENT LITERATURE

Patent Literature 1: JP-A-2003-327331

BRIEF SUMMARY

Technical Problem

With the conventional receiving and shipping registration processing system described above, it is possible to manage the entirety of pieces of information of multiple products loaded onto delivery carriers in a short time without increasing manpower related to the products to be distributed. However, the receiving and shipping registration processing system does not manage information on a delivery company or a delivery vehicle, and when the system is applied to a delivery center (physical distribution center) including multiple shipping areas (shipping gates), for example, products (delivery carriers) might mistakenly be handed over to a company other than the scheduled delivery company.

In view of the above, a main object of the present disclosure is to more reliably suppress erroneous delivery of a package in a physical distribution center including multiple shipping gates.

Solution to Problem

A physical distribution management system of the present disclosure is a physical distribution management system applied to a physical distribution center including multiple shipping gates, the system including: a storage device configured to store, for each of multiple delivery vehicles, an ID of a delivery vehicle, a package to be loaded onto the delivery vehicle, a shipping destination of the package, and an ID of the shipping gate where loading onto the delivery vehicle is performed, in association with each other; an ID acquisition device configured to acquire an ID of a delivery vehicle that has arrived at the physical distribution center; and a management device configured to determine the shipping gate where the loading onto the delivery vehicle is performed, based on the ID of the delivery vehicle acquired by the ID acquisition device and information stored in the storage device, and notify the delivery vehicle of the determined shipping gate.

A physical distribution management system of the present disclosure is applied to a physical distribution center including multiple shipping gates, and includes a storage device, an ID acquisition device, and a management device. The storage device stores, for each of multiple delivery vehicles, an ID of a delivery vehicle, a package to be loaded onto the delivery vehicle, a shipping destination of the package, and an ID of the shipping gate where loading onto the delivery vehicle is performed, in association with each other. The ID acquisition device acquires an ID of a delivery vehicle that has arrived at the physical distribution center, that is, an ID of a delivery vehicle that actually has arrived at the physical distribution center or an ID of a delivery vehicle scheduled to arrive at the physical distribution center. Then, the management device determines a shipping gate where the loading onto the delivery vehicle is performed, based on the ID of the delivery vehicle acquired by the ID acquisition device and the information stored in the storage device, and notifies the delivery vehicle of the determined shipping gate. Accordingly, it is possible to accurately guide the delivery vehicle that has arrived at the physical distribution center to the shipping gate where the package for the scheduled shipping destination is loaded. As a result, it is possible to more reliably suppress erroneous delivery of a package in a physical distribution center including multiple shipping gates.

A physical distribution management method of the present disclosure is a physical distribution management method applied to a physical distribution center including multiple shipping gates, the method including: storing, for each of multiple delivery vehicles, an ID of a delivery vehicle, a package to be loaded onto the delivery vehicle, a shipping destination of the package, and an ID of the shipping gate where loading onto the delivery vehicle is performed, in association with each other in a storage device; acquiring an ID of a delivery vehicle that has arrived at the physical distribution center; and determining the shipping gate where the loading onto the delivery vehicle is performed, based on the acquired ID of the delivery vehicle and information stored in the storage device, and notifying the delivery vehicle of the determined shipping gate.

With this method, the delivery vehicle that has arrived at the entrance can be accurately guided to the shipping gate where the package for the scheduled shipping destination is loaded. As a result, it is possible to more reliably suppress erroneous delivery of a package in a physical distribution center including multiple shipping gates.

Another physical distribution management system of the present disclosure is a physical distribution management system applied to a physical distribution center including multiple shipping gates, the system including: a storage device configured to store, for each of multiple delivery vehicles, an ID of a delivery vehicle, a package to be loaded onto the delivery vehicle, and a shipping destination of the package, in association with each other; multiple ID acquisition devices provided at each of the multiple shipping gates and configured to acquire an ID of each delivery vehicle that has arrived; and a management device configured to determine the shipping gate where the delivery vehicle has arrived as the shipping gate where loading onto the delivery vehicle is performed, and cause the storage device to store an ID of the shipping gate where the delivery vehicle has arrived, in association with the ID of the delivery vehicle, the package to be loaded onto the delivery vehicle, and the shipping destination of the package, based on the ID of the delivery vehicle acquired by the ID acquisition device.

Another physical distribution management system of the present disclosure is applied to a physical distribution center including multiple shipping gates, and includes a storage device, multiple ID acquisition devices, and a management device. The storage device stores an ID of a delivery vehicle, a package to be loaded onto the delivery vehicle, and a shipping destination of the package, in association with each other for each of multiple delivery vehicles. The multiple ID acquisition devices are provided at each of the multiple shipping gates and acquire the ID of each delivery vehicle that has arrived. Then, the management device determines the shipping gate where the delivery vehicle has arrived as the shipping gate where loading onto the delivery vehicle is performed, and causes the storage device to store an ID of the shipping gate where the delivery vehicle has arrived, in association with the ID of the delivery vehicle, the package to be loaded onto the delivery vehicle, and the shipping destination of the package, based on the ID of the delivery vehicle acquired by the ID acquisition device. Accordingly, the corresponding package can be conveyed to the shipping gate where the delivery vehicle has arrived and the package for the scheduled shipping destination can be loaded onto the delivery vehicle. As a result, it is possible to more reliably suppress erroneous delivery of a package in a physical distribution center including multiple shipping gates.

Another physical distribution management method of the present disclosure is a physical distribution management method applied to a physical distribution center including multiple shipping gates, the method including: storing, for each of multiple delivery vehicles, an ID of a delivery vehicle, a package to be loaded onto the delivery vehicle, and a shipping destination of the package, in association with each other in a storage device; acquiring an ID of a delivery vehicle that has arrived at each of the multiple shipping gates, and determining the shipping gate where the delivery vehicle has arrived as the shipping gate where loading onto the delivery vehicle is performed, and causing the storage device to store an ID of the shipping gate where the delivery vehicle has arrived, in association with the ID of the delivery vehicle, the package to be loaded onto the delivery vehicle, and the shipping destination of the package, based on the ID of the delivery vehicle.

With this method, the corresponding package can be conveyed to the shipping gate where the delivery vehicle has arrived and the package for the scheduled shipping destination can be loaded onto the delivery vehicle. As a result, it is possible to more reliably suppress erroneous delivery of a package in a physical distribution center including multiple shipping gates.

DESCRIPTION OF EMBODIMENTS

Next, an embodiment for carrying out the present disclosure will be described with reference to the drawings.

Figure 1:
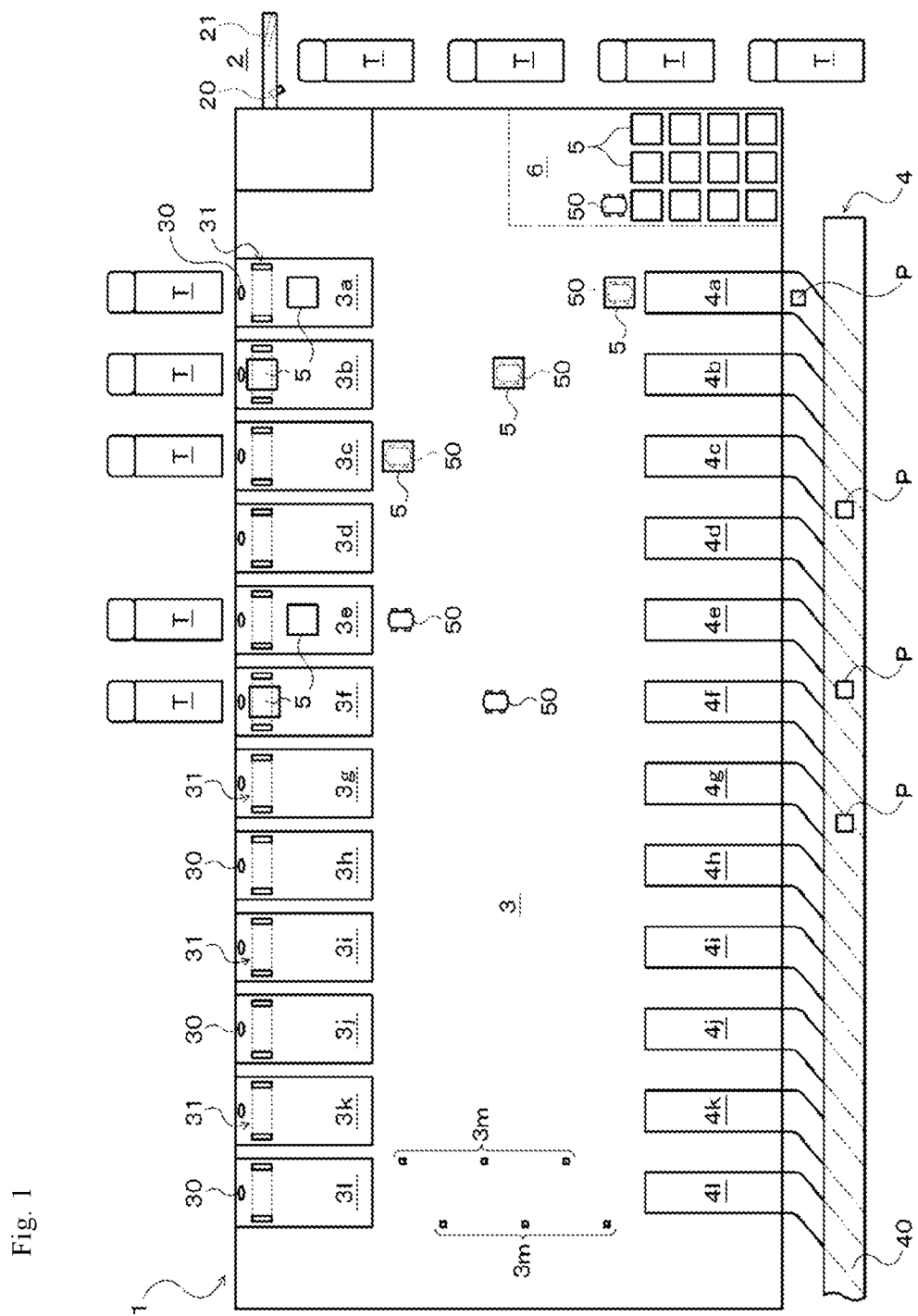
FIG. 1 is a schematic configuration view illustrating a physical distribution center where a physical distribution management system of the present disclosure is applied.
Figure 2:
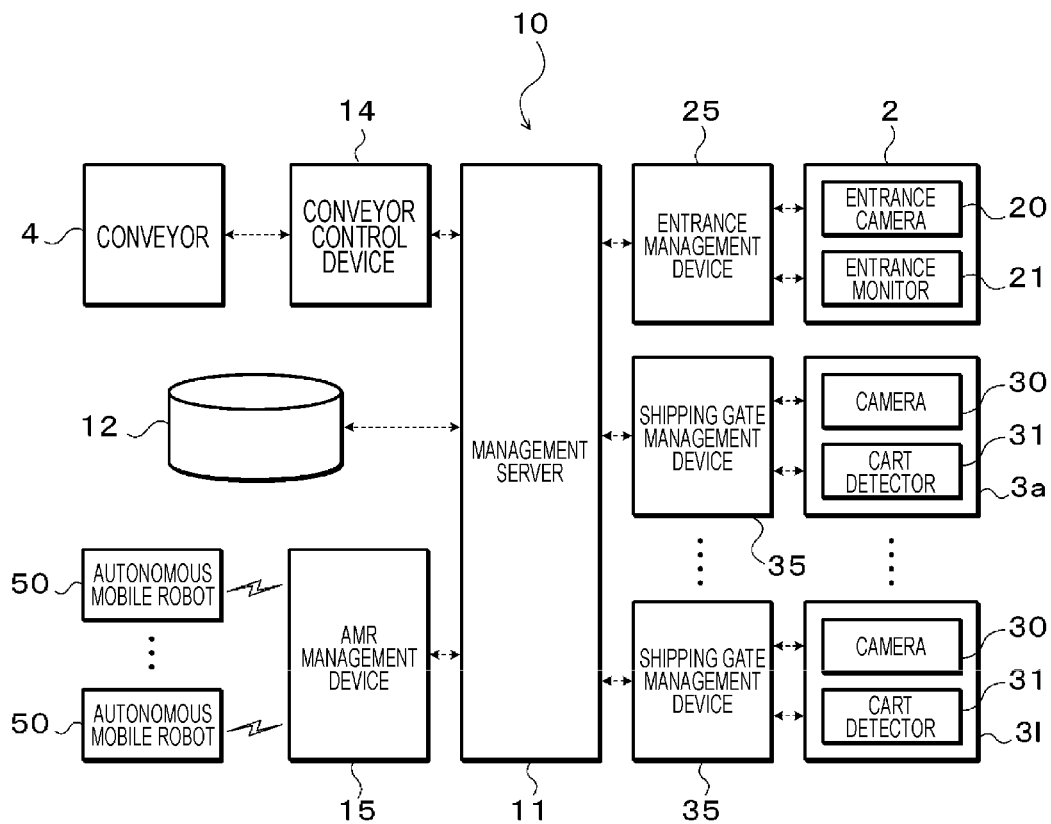
FIG. 2 is a block diagram illustrating the physical distribution management system of the present disclosure.

FIG. 1 is a schematic configuration view illustrating physical distribution center 1 where physical distribution management system 10 of the present disclosure is applied, and FIG. 2 is a block diagram illustrating physical distribution management system 10 of the present disclosure. Physical distribution center 1 illustrated in FIG. 1 is a facility in which storage, transport, package handling, packaging, distribution processing, and the like of packages (products) are performed. As illustrated, physical distribution center 1 includes, entrance 2 for delivery vehicle T such as a truck, shipping area 3 having multiple shipping gates 3a, 3b, 3c, 3d, 3e, 3f, 3g, 3h, 3i, 3j, 3k, and 3l (hereinafter, the shipping gates are collectively referred to as "shipping gates 3x" as appropriate), conveyor 4 that conveys a large number of packaged packages P from a warehouse (not illustrated) to shipping area 3, multiple carts 5, and autonomous mobile robots (AMR) 50, which are multiple moving bodies that can autonomously travel. In physical distribution center 1, package P is conveyed to shipping area 3 by conveyor 4 and transferred to cart 5. Cart 5 serving as a package handling equipment on which package P is placed is conveyed to corresponding shipping gate 3x by autonomous mobile robot 50. Cart 5 on which package P is placed is loaded onto corresponding delivery vehicle T at shipping gate 3x, and is conveyed to the shipping destination by delivery vehicle T.

In entrance 2 of physical distribution center 1, entrance camera 20 for imaging delivery vehicle T that has arrived at entrance 2 (physical distribution center 1), monitor 21 for visually providing various information to a driver of delivery vehicle T, and entrance management device 25 (refer to FIG. 2) are installed. Entrance management device 25 is a computer including CPU, ROM, RAM, a storage device, a communication module, and the like, and acquires the ID of delivery vehicle T that has arrived at entrance 2 based on imaging data (image data) of entrance camera 20. That is, entrance camera 20 and entrance management device 25 function as ID acquisition devices of entrance 2. In the present embodiment, the ID of delivery vehicle T is, for example, a pre-assigned number provided to delivery vehicle T from physical distribution center 1, and a marker (not illustrated) indicating the ID is attached to delivery vehicle T to be recognizable from entrance camera 20. However, the ID of delivery vehicle T may be a vehicle registration number of delivery vehicle T or a number of an in-vehicle device such as ETC acquired via a communication device (not illustrated). Further, entrance management device 25 causes monitor 21 to display information to be provided to the driver.

Each of shipping gates 3a to 3l is provided with camera 30 for imaging an image of delivery vehicle T that has arrived at shipping gates 3a to 3l, cart detector 31 capable of imaging cart 5 passing during loading onto delivery vehicle T, and shipping gate management device 35 (refer to FIG. 2). Shipping gate management device 35 is a computer including CPU, ROM, RAM, a storage device, a communication module, and the like, and acquires the ID of delivery vehicle T that has arrived at shipping gate 3a, 3b, . . . , or 3l based on imaging data (image data) of camera 30. That is, camera 30 and shipping gate management device 35 function as delivery vehicle ID acquisition devices in each of shipping gates 3a to 3l. In addition, shipping gate management device 35 acquires the ID of cart 5 to be loaded onto delivery vehicle T based on imaging data (image data) of cart detector 31. That is, cart detector 31 and shipping gate management device 35 function as cart ID acquisition devices in each of shipping gates 3a to 3l.

Conveyor 4 includes main conveyance line 40 and multiple shipping lines 4a, 4b, 4c, 4d, 4e, 4f, 4g, 4h, 4i, 4j, 4k, and 4l branched from main conveyance line 40 so as to face the corresponding one of shipping gates 3a to 3l (hereinafter, the shipping lines are collectively referred to as a "shipping line 4x" as appropriate). Conveyor 4 is controlled by conveyor control device 14 (refer to FIG. 2) which is a computer including CPU, ROM, RAM, a storage device, a communication module, and the like. A barcode seal indicating the ID is attached to package P handled in physical distribution center 1, and conveyor control device 14 controls conveyor 4 based on the ID of package P. That is, conveyor control device 14 acquires the ID of package P on main conveyance line 40 via a barcode reader (not illustrated), and causes conveyor 4 to sort package P conveyed to shipping area 3 by main conveyance line 40 to corresponding shipping line 4x based on the acquired ID.

Figure 3:
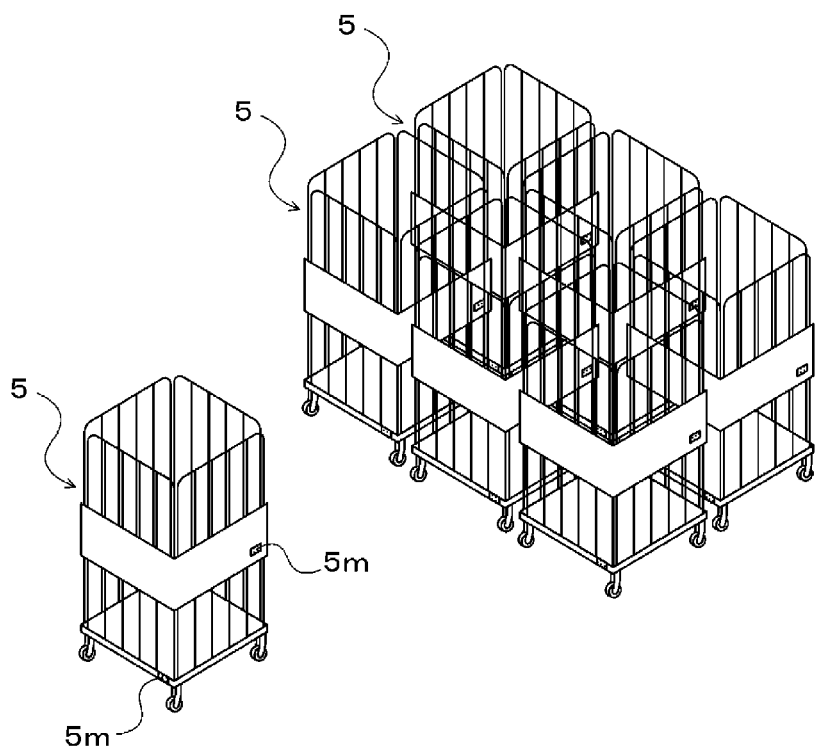
FIG. 3 is a perspective view illustrating a cart used in the physical distribution center of FIG. 1.

Cart 5 is a so-called basket cart as illustrated in FIG. 3, and includes marker 5m as a recognition target such as an AR marker, a QR code (registered trademark), or a barcode indicating the ID of cart 5. Marker 5m is provided at least one position (two positions in the example of FIG. 3) of cart 5 to be recognizable by autonomous mobile robot 50 and cart detector 31. In physical distribution center 1, as illustrated in FIG. 1, storage location (arrangement location) 6 is secured in shipping area 3. Unused carts 5 are arranged to be aligned at storage location 6, and cart 5 which is the use target is identified by autonomous mobile robot 50 and conveyed from storage location 6 to the designated position. Further, multiple markers 3m, which are recognition targets such as the AR marker and QR code for causing autonomous mobile robot 50 to autonomously travel, are attached to the floor surface, columns, and the like of shipping area 3 in the building of physical distribution center 1.

As illustrated in FIG. 2, physical distribution management system 10 includes management server 11 serving as a management device, and storage device 12. Management server 11 is a computer including CPU, ROM, RAM, a communication module, and the like. Management server 11 acquires various information from entrance management device 25 and shipping gate management device 35 of each of shipping gates 3a to 3l, and transmits requested information and command signals to entrance management device 25 and each shipping gate management device 35. Further, management server 11 transmits the ID of package P and information necessary for sorting package P to conveyor control device 14, and exchanges information with AMR management device 15. AMR management device 15 is a computer including CPU, ROM, RAM, a storage device, a communication module, and the like, and manages multiple autonomous mobile robots 50 by exchanging information with multiple autonomous mobile robots 50 via wireless communication.

Storage device 12 of physical distribution management system 10 stores a delivery database in which information related to delivery of package P is stored for each of multiple delivery vehicles T to which IDs are assigned from physical distribution center 1. The delivery database stores, in the ID of delivery vehicle T, the ID of package P loaded onto delivery vehicle T, the shipping destination of package P, and the ID of shipping gate 3x (hereinafter, referred to as a "loading gate 3z" as appropriate) at which loading onto delivery vehicle T is performed in link with (in association with) each other. Further, storage device 12 stores area information including a movable area and a movement prohibited area of autonomous mobile robot 50 in shipping area 3 (physical distribution center 1), identification mark information of each area, position information of marker 3m, a time period in which movement is prohibited, and the like.

Figure 4:
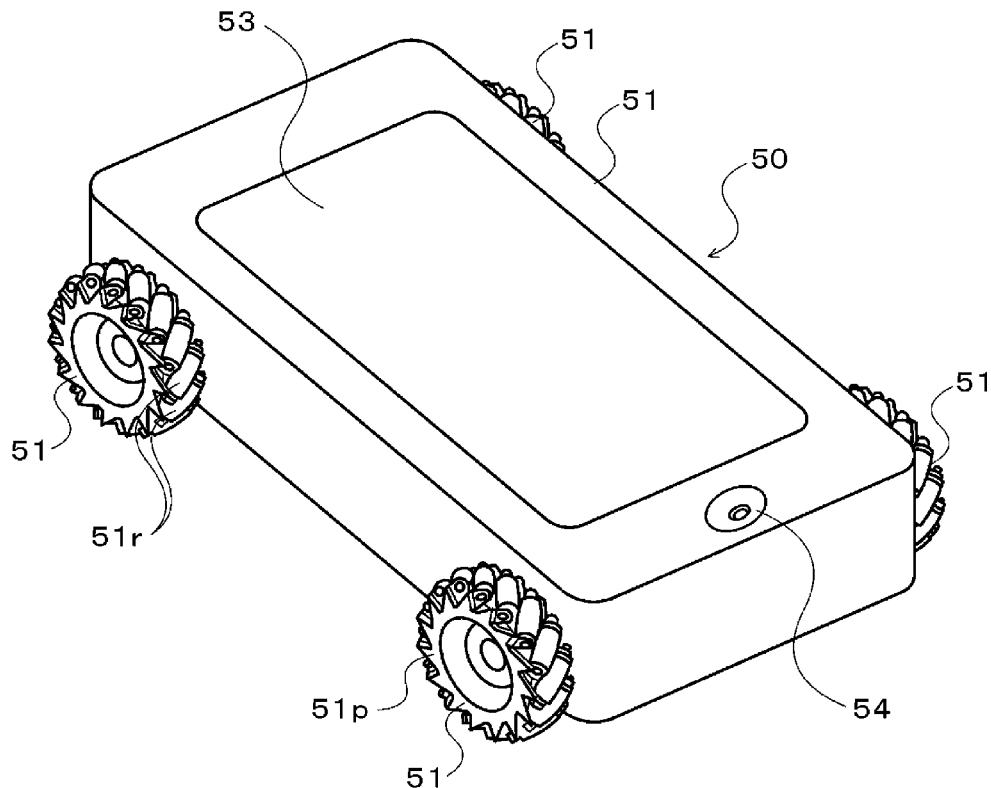
FIG. 4 is a perspective view illustrating an autonomous mobile robot used in the physical distribution center of FIG. 1.
Figure 5:
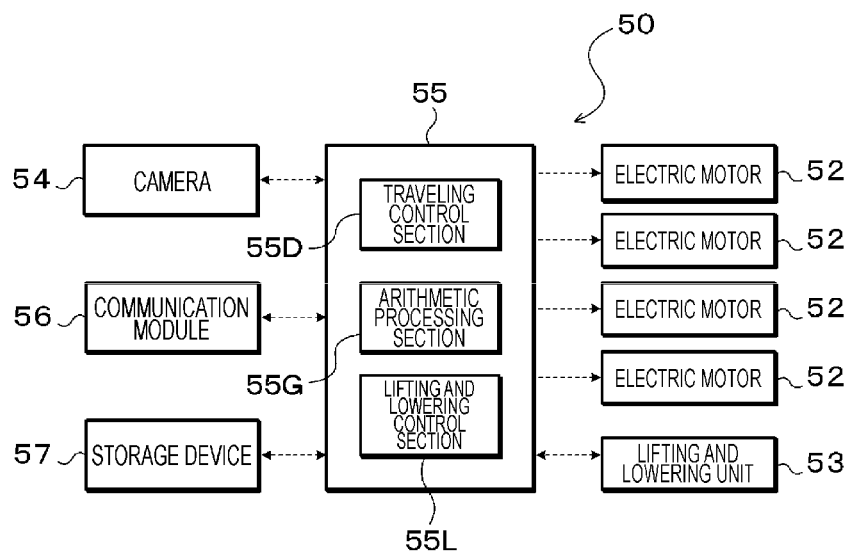
FIG. 5 is a control block diagram of the autonomous mobile robot of FIG. 4.

FIG. 4 is a perspective view illustrating autonomous mobile robot 50, and FIG. 5 is a control block diagram of autonomous mobile robot 50. As illustrated in FIGS. 4 and 5, autonomous mobile robot 50 includes multiple (four) mecanum wheels 51, multiple (four) electric motors 52 for rotationally driving corresponding mecanum wheels 51, and lifting and lowering unit 53 for lifting and lowering cart 5, and is configured to be movable forward and backward below cart 5. Each mecanum wheel 51 includes a pair of support plates 51p, and multiple rollers 51r which are supported to be arranged in an annular shape by the pair of support plates 51p and which are rotatable about an axis tilted by 45° with respect to an axle. Accordingly, by controlling the rotation directions and the rotation speeds of multiple electric motors 52, it is possible to move autonomous mobile robot 50 in all directions, and to spin turn, pivot turn, or power turn autonomous mobile robot 50. Lifting and lowering unit 53 includes a support member that supports cart 5, and a drive device that lifts and lowers the support member with respect to the main body of autonomous mobile robot 50 so that each wheel of cart 5 is separated from a traveling road surface or is grounded on the traveling road surface.

Autonomous mobile robot 50 further includes camera 54 serving as an imaging device, control device 55, communication module 56 provided for communication (wireless communication) with AMR management device 15 and other autonomous mobile robots 50, and storage device 57. Camera 54 images the surroundings of autonomous mobile robot 50 and transmits the imaging data (image data) to control device 55. Control device 55 is a computer including CPU, ROM, RAM, and the like. As illustrated in FIG. 5, arithmetic processing section 55G, traveling control section 55D, and lifting and lowering control section 55L are constructed in control device 55 by cooperation between hardware such as CPU, ROM, and RAM and various programs installed in advance.

Arithmetic processing section 55G of control device 55 uses a VSLAM technology (self-location estimation technology), acquires the self-location (three-dimensional coordinates) in shipping area 3 (physical distribution center 1) of autonomous mobile robot 50 and the environment map based on the imaging data of camera 54 at predetermined time intervals (very short time) during traveling of autonomous mobile robot 50, and causes storage device 57 to store the self-location and the environment map. In addition, arithmetic processing section 55G can recognize (identify) marker 3m of shipping area 3 and marker 5m of cart 5 (the ID of cart 5) from the imaging data of camera 54, and can recognize (identify) the target object itself such as cart 5. Further, arithmetic processing section 55G recognizes marker 3m arranged in shipping area 3 during traveling of autonomous mobile robot 50, and corrects the estimated self-location and the environment map based on the position of marker 3m in advance. Arithmetic processing section 55G can adjust sensitivity (gain of the imaging element) and the exposure time (shutter speed) of camera 54. Further, arithmetic processing section 55G causes storage device 57 to store the imaging conditions of camera 54, that is, the sensitivity and the exposure time when the recognition targets such as markers 3m and 5m can be normally recognized from the imaging data of camera 54 in association with the place (ID) of marker 3m or the like, or the time period in which marker 3m or the like is imaged.

Traveling control section 55D of control device 55 controls multiple electric motors 52 based on the self-location (current position), the environment map, and the like acquired by arithmetic processing section 55G. Further, lifting and lowering control section 55L causes lifting and lowering unit 53 to lift or lower cart 5 when autonomous mobile robot 50 is positioned below cart 5. Arithmetic processing section 55G of control device 55 may be configured to acquire the self-location and the environment map by the SLAM technology using 2D or 3D LiDAR (laser sensor) or the like, may be configured to estimate the self-location based only on the position of the marker, or may be configured to acquire the self-location and the environment map by indoor positioning technology using a beacon or the like. Further, autonomous mobile robot 50 may include a wheel including a general rubber tire, which includes a wheel other than the mecanum wheel.

Figure 6:
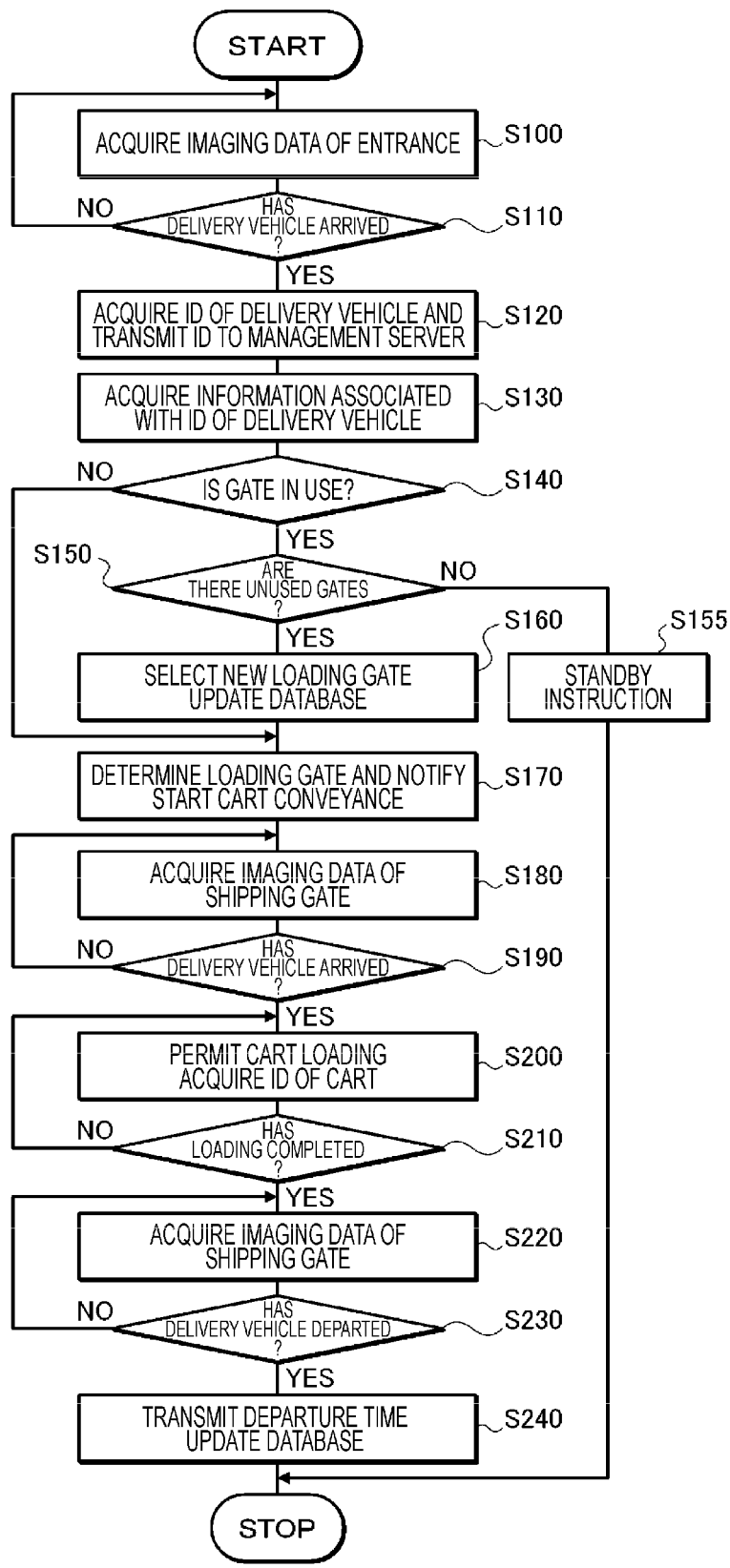
FIG. 6 is a flowchart illustrating a procedure of loading a package onto a delivery vehicle and shipping the package in the physical distribution management system of the present disclosure.

Next, a procedure of loading package P onto delivery vehicle T that has arrived at physical distribution center 1 described above and shipping package P will be described with reference to FIG. 6 and the like. As illustrated in FIG. 6, entrance management device 25 installed at entrance 2 acquires imaging data (image data) of entrance camera 20 (step S100), and determines whether delivery vehicle T has arrived at entrance 2 (gate) based on the imaging data (step S110). When it is determined that delivery vehicle T has not arrived at entrance 2 (step S110: NO), entrance management device 25 acquires the imaging data of entrance camera 20 at predetermined time intervals (step S100), and executes the determination process of step S110. When it is determined that delivery vehicle T has arrived at entrance 2 based on the imaging data of entrance camera 20 (step S110: YES), entrance management device 25 acquires the ID of delivery vehicle T that has arrived at entrance 2 from the imaging data and transmits the ID of delivery vehicle T and the arrival time of delivery vehicle T to management server 11 (step S120).

When acquiring the ID of delivery vehicle T or the like from entrance management device 25, management server 11 reads the ID of package P associated with the acquired ID of delivery vehicle T, the shipping destination of package P, and the ID of shipping gate 3x serving as loading gate 3z from storage device 12 (step S130). Further, management server 11 determines whether shipping gate 3x serving as loading gate 3z of delivery vehicle T that has arrived at entrance 2 is in use (step S140). When it is determined that shipping gate 3x is in use (step S140: YES), management server 11 determines whether there are unused shipping gates 3x (step S150).

When it is determined that shipping gate 3x is in use and that there are unused shipping gates 3x (step S150: YES), management server 11 selects any of unused shipping gates 3x (for example, shipping gate 3x closest to entrance 2) as new loading gate 3z (step S160). Further, in step S160, management server 11 updates the delivery database by causing storage device 12 to store the ID of new loading gate 3z in association with the ID of delivery vehicle T that has arrived at entrance 2. When it is determined that shipping gate 3x serving as loading gate 3z of delivery vehicle T that has arrived at entrance 2 is unused (step S140: NO), management server 11 skips the processing of steps S150 to S160. Further, when it is determined that there are no unused shipping gates 3x (step S150: NO), management server 11 transmits a command signal to entrance management device 25 to cause monitor 21 to display information that the driver of the delivery vehicle at entrance 2 needs to standby at entrance 2 (step S155), and temporarily ends the series of processing of FIG. 6.

After the processing of step S140 or S160, management server 11 determines shipping gate 3x acquired in step S130 or shipping gate 3x selected in step S160 as new loading gate 3z, transmits the ID of shipping gate 3x serving as loading gate 3z to entrance management device 25, and entrance management device 25 causes monitor 21 to display information for notifying delivery vehicle T at entrance 2 of shipping gate 3x serving as loading gate 3z (step S170). In step S170, necessary information may be notified to a mobile terminal such as a smartphone of the driver of delivery vehicle T in addition to or instead of the display on monitor 21.

In step S170, management server 11 transmits information such as the ID of delivery vehicle T that has arrived at entrance 2, the ID of package P associated with the ID of corresponding delivery vehicle T, and the shipping destination of package P to shipping gate management device 35 of shipping gate 3x serving as loading gate 3z. Further, in step S170, management server 11 transmits necessary information such as the ID of shipping gate 3x to AMR management device 15 in order to start conveyance of package P (cart 5) to shipping gate 3x serving as loading gate 3z. AMR management device 15 transmits necessary information including the ID of shipping gate 3x serving as loading gate 3z to corresponding autonomous mobile robot 50, and reflects shipping gate 3x on the travel route of autonomous mobile robot 50. Autonomous mobile robot 50 that has received the information from AMR management device 15 recognizes (identifies) cart 5 having the corresponding ID from the imaging data of camera 54, and conveys cart 5 to corresponding shipping gate 3x (step S170).

When receiving the ID or the like of delivery vehicle T from management server 11, shipping gate management device 35 of shipping gate 3x serving as loading gate 3z acquires imaging data (image data) of camera 30 (step S180), and determines whether delivery vehicle T having the ID has arrived at shipping gate 3x based on the imaging data (step S190). When it is determined that corresponding delivery vehicle T has not arrived at shipping gate 3x (step S190: NO), shipping gate management device 35 acquires the imaging data of camera 30 at predetermined time intervals (step S180), and executes the determination process of step S190. When it is determined that corresponding delivery vehicle T has arrived at shipping gate 3x based on the imaging data of camera 30 (step S190: YES), shipping gate management device 35 causes a monitor (not illustrated) to display information for permitting the driver (or another operator or the like) of delivery vehicle T to load cart 5 (step S200).

The driver or the like of delivery vehicle T pushes cart 5, conveyed to shipping gate 3x by autonomous mobile robot 50, to pass through cart detector 31, and then loads cart 5 onto delivery vehicle T (step S200). In step S200, shipping gate management device 35 acquires the ID of cart 5 having passed through cart detector 31 based on the imaging data (image data) of cart detector 31, acquires the passing time, and transmits the acquired ID of cart 5 and the acquired passing time to management server 11. Further, shipping gate management device 35 determines whether all carts 5 to be shipped have been loaded onto delivery vehicle T (step S210). When it is determined that all carts 5 have not been loaded onto delivery vehicle T (step S210: NO), shipping gate management device 35 executes the processing of steps S200 and S210.

When it is determined that all carts 5 have been loaded onto delivery vehicle T (step S210: YES), shipping gate management device 35 acquires the imaging data of camera 30 (step S220), and determines whether delivery vehicle T has departed from shipping gate 3x serving as loading gate 3z based on the imaging data (step S230). When it is determined that delivery vehicle T has not departed from shipping gate 3x (step S230: NO), shipping gate management device 35 acquires the imaging data of camera 30 at predetermined time intervals (step S220), and executes the determination process of step S230.

When it is determined that delivery vehicle T has departed from shipping gate 3x based on the imaging data of camera 30 (step S230: YES), shipping gate management device 35 transmits the ID of delivery vehicle T and the departure time to management server 11 (step S240). In step S240, management server 11 updates the delivery database described above by causing storage device 12 to store the acquired departure time of delivery vehicle T in association with the ID of delivery vehicle T as well as with the arrival time of delivery vehicle T acquired in step S120 and the passing time of cart 5 (time at which loaded onto delivery vehicle T) acquired in step S210. Thus, the series of processing for loading package P onto delivery vehicle T and shipping package P is completed.

As described above, physical distribution management system 10 is applied to physical distribution center 1 having entrance 2 for delivery vehicle T and multiple shipping gates 3a to 3l, and includes entrance camera 20 and entrance management device 25 serving as ID acquisition devices at entrance 2 for delivery vehicle T, management server 11, and storage device 12. Entrance management device 25 acquires the ID of delivery vehicle T that has arrived at entrance 2 based on the imaging data of entrance camera 20. Storage device 12 stores, for each of multiple delivery vehicles T, the ID of delivery vehicle T, the ID of package P to be loaded onto delivery vehicle T, the shipping destination of package P, and the ID of shipping gate 3x serving as loading gate 3z in association with each other. Then, management server 11 determines shipping gate 3x serving as loading gate 3z of delivery vehicle T that has arrived at entrance 2 based on the ID of delivery vehicle T acquired by entrance camera 20 and entrance management device 25 and the information stored in storage device 12, and notifies delivery vehicle T at entrance 2 of determined shipping gate 3x via entrance management device 25 (step S170 of FIG. 6). Accordingly, delivery vehicle T that has arrived at entrance 2 can be accurately guided to shipping gate 3x where package P for the scheduled shipping destination is loaded. As a result, it is possible to more reliably suppress erroneous delivery of package P in physical distribution center 1 having multiple shipping gates 3a to 3l.

When shipping gate 3x, determined as loading gate 3z based on the ID of delivery vehicle T acquired by entrance camera 20 and entrance management device 25 and the information stored in storage device 12, is in use (step S140 of FIG. 6: YES), management server 11 determines any of unused shipping gates 3x as loading gate 3z of delivery vehicle T that has arrived at entrance 2 and notifies delivery vehicle T at entrance 2 of determined shipping gate 3x via entrance management device 25 (steps S150 to S170 of FIG. 6). Accordingly, it is possible to suppress congestion of delivery vehicle T waiting for loading at entrance 2 when the amount of package P is large or the like, and to favorably suppress delay in loading work.

Further, storage device 12 stores, for each of multiple delivery vehicles T, the ID of cart 5 on which package P is loaded and which is loaded onto delivery vehicle T in association with the ID of delivery vehicle T, the ID of package P loaded onto delivery vehicle T, the shipping destination of package P, and the ID of shipping gate 3x serving as loading gate 3z. In addition, each of multiple shipping gates 3a to 3l is provided with camera 30 and shipping gate management device 35 serving as delivery vehicle ID acquisition devices that acquire the ID of delivery vehicle T and notify the ID to management server 11, and cart detector 31 that constitutes a cart ID acquisition device that acquires the ID of cart 5 together with shipping gate management device 35 and notifies the ID to management server 11. Accordingly, it is possible to manage the arrival of delivery vehicle T at shipping gates 3a to 3l and the loading situation of cart 5 onto delivery vehicle T.

In addition, physical distribution center 1 includes multiple autonomous mobile robots 50 that convey cart 5 to shipping gates 3a to 3l, and management server 11 determines shipping gate 3x where loading onto delivery vehicle T is performed, and then reflects determined shipping gate 3x on the corresponding route of autonomous mobile robots 50 via AMR control device 15. Accordingly, since cart 5 to be loaded onto delivery vehicle T stopped at shipping gate 3x serving as loading gate 3z can be automatically conveyed to shipping gate 3x by using autonomous mobile robot 50 serving as the moving body, it is possible to more reliably suppress erroneous delivery of package P.

Further, physical distribution center 1 includes conveyor 4 having multiple shipping lines 4a to 4l, and management server 11 cause conveyor 4 to convey package P to corresponding shipping line 4x in cooperation with conveyor control device 14. Accordingly, it is possible to convey package P to the shipping line (for example, the closest shipping line) corresponding to shipping gate 3x where delivery vehicle T on which package P is to be loaded is stopped.

In physical distribution center 1, entrance camera 20 and entrance management device 25 serving as ID acquisition devices are provided at entrance 2 for delivery vehicle T; however, the configuration is not limited to this. That is, the ID acquisition device may be disposed at any place other than entrance 2 of physical distribution center 1 where the ID of delivery vehicle T is easily acquired. For example, the ID of delivery vehicle T may be acquired when delivery vehicle T arrives at physical distribution center 1 or before delivery vehicle T arrives at physical distribution center 1 by receiving the ID transmitted from the in-vehicle communication device of delivery vehicle T scheduled to arrive at physical distribution center 1 via wireless communication by the ID acquisition device disposed at any place of physical distribution center 1. In this case, shipping gate 3x where loading onto delivery vehicle T is performed may be notified to delivery vehicle T before or after arrival at physical distribution center 1.

In physical distribution center 1, as described above, delivery vehicle T that has arrived at entrance 2 is guided to shipping gate 3x displayed on monitor 21 of entrance 2; however, the configuration is not limited to this. That is, for example, when the handling amount of package P in physical distribution center 1 is relatively small, the acquisition of the ID of delivery vehicle T at entrance 2 may be omitted, and delivery vehicle T may be stopped at unused shipping gate 3x. In this case, package P can be loaded onto delivery vehicle T and shipped according to the procedure illustrated in FIG. 7.

Figure 7:
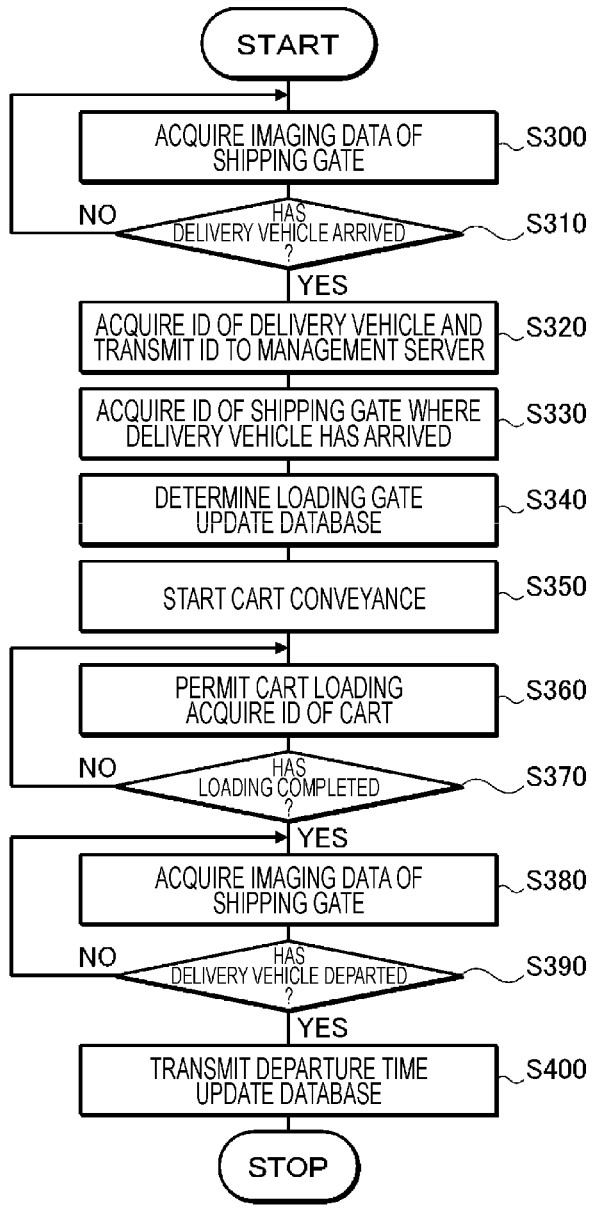
FIG. 7 is a flowchart illustrating a procedure of loading a package onto a delivery vehicle and shipping the package in second physical distribution management system of the present disclosure.

As illustrated in FIG. 7, shipping gate management device 35 of each of shipping gates 3a to 3l acquires imaging data of camera 30 (step S300), and determines whether delivery vehicle T has arrived at shipping gate 3x based on the imaging data (step S310). When it is determined that delivery vehicle T has not arrived at shipping gate 3x (step S310: NO), shipping gate management device 35 acquires the imaging data of camera 30 at predetermined time intervals (step S300), and executes the determination process of step S310. When it is determined that delivery vehicle T has arrived at shipping gate 3x based on the imaging data of camera 30 (step S310: YES), shipping gate management device 35 acquires the ID of delivery vehicle T that has arrived at shipping gate 3x based on the imaging data of camera 30 and transmits the ID of delivery vehicle T and the arrival time of delivery vehicle T to management server 11 (step S320).

When acquiring the ID or the like of delivery vehicle T from any of shipping gate management devices 35, management server 11 acquires an ID of shipping gate 3x where delivery vehicle T has arrived (step S330). Further, management server 11 determines shipping gate 3x where delivery vehicle T has arrived as loading gate 3z, and updates the delivery database by causing storage device 12 to store the ID of shipping gate 3x serving as loading gate 3z in association with the ID of delivery vehicle T that has arrived at shipping gate 3x (step S340). Further, management server 11 transmits necessary information such as the ID of shipping gate 3x to AMR management device 15 in order to start conveyance of package P (cart 5) to shipping gate 3x serving as loading gate 3z. AMR management device 15 transmits necessary information including the ID of shipping gate 3x serving as loading gate 3z to corresponding autonomous mobile robot 50, and reflects shipping gate 3x on the travel route of autonomous mobile robot 50. Autonomous mobile robot 50 that has received the information from AMR management device 15 recognizes (identifies) cart 5 having the corresponding ID from the imaging data of camera 54, and conveys cart 5 to corresponding shipping gate 3x (step S350).

When shipping gate management device 35 of shipping gate 3x where delivery vehicle T has arrived checks that first cart 5 has been conveyed by autonomous mobile robot 50, shipping gate management device 35 causes a monitor (not illustrated) to display information for permitting the driver (or another operator or the like) of delivery vehicle T to load cart 5 (step S360). The driver or the like of delivery vehicle T pushes cart 5, conveyed to shipping gate 3x by autonomous mobile robot 50, to pass through cart detector 31, and then loads cart 5 onto delivery vehicle T (step S360). In step S360, shipping gate management device 35 acquires the ID of cart 5 having passed through cart detector 31 based on the imaging data of cart detector 31, acquires the passing time, and transmits the acquired ID of cart 5 and the acquired passing time to management server 11. Further, shipping gate management device 35 determines whether all carts 5 to be shipped have been loaded onto delivery vehicle T (step S370). When it is determined that all carts 5 have not been loaded onto delivery vehicle T (step S370: NO), shipping gate management device 35 executes the processing of steps S360 and S370.

When it is determined that all carts 5 have been loaded onto delivery vehicle T (step S370: YES), shipping gate management device 35 acquires the imaging data of camera 30 (step S380), and determines whether delivery vehicle T has departed from shipping gate 3x serving as loading gate 3z based on the imaging data (step S390). When it is determined that delivery vehicle T has not departed from shipping gate 3x (step S390: NO), shipping gate management device 35 acquires the imaging data of camera 30 at predetermined time intervals (step S380), and executes the determination process of step S390. When it is determined that delivery vehicle T has departed from shipping gate 3x based on the imaging data of camera 30 (step S230: YES), shipping gate management device 35 transmits the ID of delivery vehicle T and the departure time to management server 11 (step S400). In step S400, management server 11 updates the delivery database described above by causing storage device 12 to store the acquired departure time of delivery vehicle T in association with the ID of delivery vehicle T as well as the arrival time of delivery vehicle T acquired in step S320 and the passing time of cart 5 (time at which loaded onto delivery vehicle T) acquired in step S360. Thus, the series of processing for loading package P onto delivery vehicle T and shipping package P according to the procedure illustrated in FIG. 7 is completed.

As described above, physical distribution management system 10 may determine shipping gate 3x where delivery vehicle T has arrived as loading gate 3z where loading onto delivery vehicle T is performed, and convey cart 5 on which corresponding package P is placed onto the shipping gate 3x. Further, management server 11 causes storage device 12 to store an ID of shipping gate 3x where delivery vehicle T has arrived in association with the ID of delivery vehicle T, the ID of package P, and the shipping destination of package P, based on the ID of delivery vehicle T acquired by camera 30 and shipping gate management device 35 serving as ID acquisition devices (step S340 of FIG. 7). In such second aspect of the physical distribution management system of the present disclosure, corresponding package P can be conveyed to shipping gate 3x where delivery vehicle T has arrived and package P for the scheduled shipping destination can be loaded onto delivery vehicle T. As a result, it is possible to more reliably suppress erroneous delivery of a package in physical distribution center 1 having multiple shipping gates 3a to 3l.

The present disclosure is by no means limited to the above embodiment, and it goes without saying that various changes can be made within the scope of the extension of the present disclosure. Further, the above embodiment is merely one specific aspect of the present disclosure, and does not limit the elements of the present disclosure.

INDUSTRIAL APPLICABILITY

The present disclosure can be used in a physical distribution center.

REFERENCE SIGNS LIST

1: physical distribution center, 2: entrance, 3: shipping area, 3a, 3b, 3c, 3d, 3e, 3f, 3g, 3h, 3i, 3j, 3k, 3l, 3x: shipping gate. 3m: marker, 4: conveyor, 4a, 4b, 4c, 4d, 4e, 4f, 4g, 4h, 4i, 4j, 4k, 4l, 4x: shipping line, 40: main conveyance line, 5: cart, 5m: marker, 6: storage location, 10: physical distribution management system, 11: management server, 12: storage device, 14: conveyor control device, 15: AMR management device, 20: entrance camera, 21: monitor, 25: entrance management device, 30: camera, 31: cart detector. 35: shipping gate management device, 50: autonomous mobile robot, 51: mecanum wheel, 51p: support plate, 51r: roller, 52: electric motor, 53: lifting and lowering unit, 54: camera, 55: control device, 55D: traveling control section, 55G: arithmetic processing section, 55L: lifting and lowering control section, 56: communication module, 57: storage device, P: package, T: delivery vehicle.

The invention claimed is:

1. A physical distribution management system applied to a physical distribution center including multiple shipping gates, the system comprising processing circuitry configured to:
    store, for each of multiple delivery vehicles, an ID of a delivery vehicle, an ID of a package to be loaded onto the delivery vehicle, an ID of a cart on which the package is loaded and which is loaded onto the delivery vehicle, a shipping destination of the package, and an ID of the shipping gate where loading onto the delivery vehicle is performed, in association with each other;
    acquire an ID of a delivery vehicle that has arrived at the physical distribution center;
    determine the shipping gate where the loading onto the delivery vehicle is performed, based on the ID of the delivery vehicle acquired by the ID acquisition device and information stored in the storage device, and notify the delivery vehicle of the determined shipping gate;
    after determining the shipping gate where the loading onto the delivery vehicle is performed, reflect the determined shipping gate on a travel route of a moving body; and
    control the moving body such that the moving body conveys the cart to the shipping gate.

2. The physical distribution management system according to claim 1, wherein
    the management device is configured to, when the shipping gate determined based on the ID of the delivery vehicle acquired by the ID acquisition device and the information stored in the storage device is used, determine an unused shipping gate that is not being used by any delivery vehicle as the shipping gate where the loading onto the delivery vehicle that has arrived at an entrance is performed, and notify the delivery vehicle at the entrance of the determined shipping gate.

3. The physical distribution management system according to claim 1, wherein
    a delivery vehicle ID acquisition device and a cart ID acquisition device are provided in each of the multiple shipping gates, the delivery vehicle ID acquisition device being configured to acquire the ID of the delivery vehicle and notify the management device of the ID of the delivery vehicle, and the cart ID acquisition device being configured to acquire the ID of the cart and notify the management device of the ID of the cart.

4. The physical distribution management system according to claim 1, wherein
    the physical distribution center includes a conveyor including multiple shipping lines, and
    the management device is configured to control the conveyor to convey the package to a corresponding shipping line.

5. The physical distribution management system according to claim 1, wherein
    the physical distribution center includes an entrance for the delivery vehicle,
    the ID acquisition device is provided at the entrance, and
    the management device is configured to notify the delivery vehicle at the entrance of the determined shipping gate.

6. A physical distribution management method applied to a physical distribution center including multiple shipping gates, the method comprising:
    storing, for each of multiple delivery vehicles, an ID of a delivery vehicle, an ID of a package to be loaded onto the delivery vehicle, an ID of a cart on which the package is loaded and which is loaded onto the delivery vehicle, a shipping destination of the package, and an ID of the shipping gate where loading onto the delivery vehicle is performed, in association with each other in a storage device;
    acquiring an ID of a delivery vehicle that has arrived at the physical distribution center;
    determining the shipping gate where the loading onto the delivery vehicle is performed, based on the acquired ID of the delivery vehicle and information stored in the storage device, and notifying the delivery vehicle of the determined shipping gate;

after determining the shipping gate where the loading onto the delivery vehicle is performed, reflecting the determined shipping gate on a travel route of a moving body; and controlling the moving body such that the moving body conveys the cart to the shipping gate.

7. A physical distribution management system applied to a physical distribution center including multiple shipping gates, the system comprising processing circuitry configured to:

store, for each of multiple delivery vehicles, an ID of a delivery vehicle, an ID of a package to be loaded onto the delivery vehicle, an ID of a cart on which the package is loaded and which is loaded onto the delivery vehicle, and a shipping destination of the package, in association with each other;

acquire an ID of each delivery vehicle that has arrived;

determine the shipping gate where the delivery vehicle has arrived as the shipping gate where loading onto the delivery vehicle is performed;

store an ID of the shipping gate where the delivery vehicle has arrived, in association with the ID of the delivery vehicle, the ID of the package to be loaded onto the delivery vehicle, the ID of the cart on which the package is loaded and which is loaded onto the delivery vehicle, and the shipping destination of the package, based on the ID of the delivery vehicle acquired by the ID acquisition device;

after determining the shipping gate where the loading onto the delivery vehicle is performed, reflect the determined shipping gate on a travel route of a moving body; and control the moving body such that the moving body conveys the cart to the shipping gate.

8. A physical distribution management method applied to a physical distribution center including multiple shipping gates, the method comprising:

storing, for each of multiple delivery vehicles, an ID of a delivery vehicle, an ID of a package to be loaded onto the delivery vehicle, an ID of a cart on which the package is loaded and which is loaded onto the delivery vehicle, and a shipping destination of the package, in association with each other in a storage device;

acquiring an ID of a delivery vehicle that has arrived at each of the multiple shipping gates;

determining the shipping gate where the delivery vehicle has arrived as the shipping gate where loading onto the delivery vehicle is performed;

storing an ID of the shipping gate where the delivery vehicle has arrived, in association with the ID of the delivery vehicle, the ID of the package to be loaded onto the delivery vehicle, the ID of the cart on which the package is loaded and which is loaded onto the delivery vehicle, and the shipping destination of the package, based on the ID of the delivery vehicle;

after determining the shipping gate where the loading onto the delivery vehicle is performed, reflecting the determined shipping gate on a travel route of a moving body; and controlling the moving body such that the moving body conveys the cart to the shipping gate.

* * * * *